3,080,292
STABLE PLEASANT-TASTING VITAMIN B CONTAINING BEADLETS
Arnold Koff, West Orange, N.J., assignor to Hoffmann-La Roche Inc., Nutley, N.J., a corporation of New Jersey
No Drawing. Filed July 12, 1960, Ser. No. 42,232
8 Claims. (Cl. 167—81)

This invention relates to a new article of manufacture and sale, more especially a new article of manufacture in the pharmaceutical field. Broadly characterized, the novel product of the invention can be described as a vitamin B material in the form of free-flowing, pleasant-tasting, stable beadlets.

Vitamin B materials, and especially thiamine, riboflavin, pyridoxine and salts thereof, have been dispensed for many years in multivitamin dosage forms, more particularly in liquid formulations and in gelatin capsules. More recently, there has been a demand for multivitamin chewable tablets containing thiamine-, riboflavin- and pyridoxine-active materials. However, the previously known forms of thiamine, riboflavin and pyridoxine have not been readily employable in chewable tablets, because of undesirable taste characteristics, and poor stability as evidenced especially by the development of off-taste.

It is an object of the present invention to provide thiamine-, riboflavin- and pyridoxine-active materials in forms having improved taste characteristics, useful preeminently for the manufacture of chewable multivitamin tablets, but useful also for other pharmaceutical products and for the preparation of vitamin-enriched foods. Accordingly, the end products of the invention are intended to be suitable (among other uses) as articles of commerce, for sale to pharmaceutical and food manufacturers.

The present invention provides processes for manufacturing thiamine-, riboflavin- and pyridoxine-active materials in the form of free-flowing, pleasant-tasting powders useful for the above purposes. More particularly, the invention provides processes which comprise forming a melt containing a vitamin B material selected from the group consisting of vitamin $B_1$, vitamin $B_2$, vitamin $B_6$ and salts thereof, uniformly distributed in a molten material comprising essentially a mixture of monoglycerides and diglycerides of naturally occurring saturated fatty acids having from sixteen to eighteen carbon atoms; atomizing said melt into discrete liquid droplets having a diameter of from about 30 microns to about 600 microns (preferably, from about 60 microns to about 250 microns); rapidly air-cooling said droplets into congealed state; and screening the resulting beadlets.

Mixtures of glyceryl monostearate and glyceryl distearate containing substantial amounts of glyceryl monopalmitate and glyceryl dipalmitate are available commercially, and such commercial mixtures can be employed for purposes of the invention. For example, "Atmos 150," a granular food emulsifier supplied by Atlas Powder Company, Wilmington, Delaware, is described as a mixture consisting essentially of mono- and diglycerides of stearic and palmitic acids with not more than 0.01% butylated hydroxy anisole, 0.01% butylated hydroxy toluene and 0.01% citric acid added as preservatives. A generally similar material is "Hydrofol Glycerides T-57-L," supplied by Archer-Daniels-Midland Company, Cleveland, Ohio. Either of these, or equivalent commercial mixtures, can be employed as the coating material of the invention.

In carrying out the processes of the invention, a first step comprises forming a melt of the glycerides mixture to be employed as the coating material, and uniformly dispersing therein the vitamin B material. Conveniently, this step is effected in a melting tank wherein the glycerides mixture is raised to a temperature several degrees (e.g. 5° C.) above its melting point, and then the finely divided vitamin B material is dispersed therein, with good agitation to produce homogeneous distribution, the temperature of the melting tank being kept sufficiently high to maintain the glycerides-vitamin mixture in a fluid state. The melt is then transferred to a conventional spray-chilling tower or chamber, wherein the molten material is atomized into droplets, which are then quickly chilled by blowing cool (about 20° C.) air through the tower. Any convenient atomizing device (such as a two-fluid nozzle or a high-speed centrifugal atomizing wheel) can be employed, under conditions that will give discrete droplets of the melt having a size in the above indicated ranges. The solidified or congealed droplets fall to the bottom of the tower, where they are collected and then screened in order to remove agglomerates or coarse material.

Among other advantages, the invention provides pleasant tasting beadlets, of the character above described, wherein a high concentration of vitamin B-active material is attained: varying from about 33% by weight (of finished beadlet) to as high as 50% by weight.

The invention is further disclosed in the following examples which are illustrative but not limitative thereof.

*Example 1*

660 g. of "Atmos 150" are charged to a melting vessel and heated, while stirring, to a temperature of 65.5° C. 340 g. of finely divided thiamine mononitrate is then mixed into the tank while stirring, and the resulting suspension is stirred for 30 minutes to assure uniform dispersal, the temperature of the melt being meanwhile gradually raised to 74° C. The melt at the latter temperature is then transferred to a centrifugal atomizer rotating at 12,000 r.p.m., the molten material being fed at the rate of 26 gallons per hour. Air at a temperature of 20° C. is blown through the spray tower. The chilled droplets fall to the bottom of the tower. Any beadlets that are carried over in the effluent air stream are collected in a cyclone separator. The beadlets at the bottom of the tower and in the cyclone separator are collected and screened through a 25 mesh screen. The product is thiamine mononitrate in the form of free-flowing, pleasant-tasting beadlets having a diameter of about 60 microns.

*Example 2*

1320 g. of "Atoms 150" are charged to a melting vessel and heated while stirring to a temperature of 65.5° C. 680 g. of finely divided riboflavin is then mixed into the tank while stirring, and the resulting suspension is stirred for 30 minutes to assure uniform dispersal, the temperature of the melt being meanwhile gradually raised to 76.5° C. The melt at the latter temperature is then transferred to a centrifugal atomizing wheel, rotated at 12,500 r.p.m., the molten material being fed at the rate of 25 gallons per hour. Air at a temperature of 20° C. is blown through the spray tower. The chilled droplets fall to the bottom of the tower. Any beadlets that are carried over in the effluent air stream are collected in a cyclone separator. All of the beadlets are collected and screened through a 25 mesh screen. The product is riboflavin in the form of free-flowing, pleasant-tasting beadlets having a diameter of about 60 microns.

*Example 3*

1980 g. of "Atoms 150" are charged to a melting vessel and heated while stirring to a temperature of 65.5° C. 1020 g. of finely divided pyridoxine hydrochloride is then mixed into the tank while stirring, and the resulting suspension is stirred for 30 minutes to assure uniform dispersal, the temperature of the melt being meanwhile gradually raised to 74° C. The melt at the latter temperature is then transferred to a centrifugal atomizing wheel rotated at 12,500 r.p.m., the molten material being fed at the rate of 25 gallons per hour. Air at a temperature of 20° C. is blown through the spray tower. The chilled droplets fall to the bottom of the tower. Any beadlets that are carried over in the effluent air stream are collected in a cyclone separator. The beadlets are all collected and screened through a 25 mesh screen. The product is pyridoxine hydrochloride in the form of free-flowing, pleasant-tasting beadlets having a diameter of about 60 microns.

I claim:

1. A vitamin B material selected from the group consisting of vitamin $B_1$, vitamin $B_2$, vitamin $B_6$ and salts thereof in the form of pleasant-tasting beadlets having a diameter of from about 30 microns to about 600 microns; said beadlets being composed substantially entirely of said vitamin B material encased in a spray-chilled coating comprising essentially a mixture of monoglycerides and diglycerides of naturally occurring saturated fatty acids having from sixteen to eighteen carbon atoms.

2. A process of making an article of manufacture according to claim 1 which comprises forming a melt containing a vitamin B material selected from the group consisting of vitamin $B_1$, vitamin $B_2$, vitamin $B_6$ and salts thereof, uniformly distributed in a molten material comprising essentially a mixture of monoglycerides and diglycerides of naturally occurring saturated fatty acids having from sixteen to eighteen carbon atoms; atomizing said melt into discrete liquid droplets having a diameter of from about 30 microns to about 600 microns; rapidly air-cooling said droplets into congealed state; and screening the resulting beadlets.

3. Thiamin mononitrate in the form of pleasant-tasting beadlets having a diameter of from about 60 microns to about 250 microns; said beadlets being composed substantially entirely of said thiamin mononitrate encased in a spray-chilled coating comprising essentially a mixture of monoglycerides and diglycerides of naturally occurring saturated fatty acids having from sixteen to eighteen carbon atoms.

4. A process of making an article of manufacture according to claim 3 which comprises forming a melt containing thiamin mononitrate uniformly distributed in a molten material comprising essentially a mixture of monoglycerides and diglycerides of naturally occurring saturated fatty acids having from sixteen to eighteen carbon atoms; atomizing said melt into discrete liquid droplets having a diameter of from about 60 microns to about 250 microns; rapidly air-cooling said droplets into congealed state; and screening the resulting beadlets.

5. Riboflavin in the form of pleasant-tasting beadlets having a diameter of from about 60 microns to about 250 microns; said beadlets being composed substantially entirely of said riboflavin encased in a spray-chilled coating comprising essentially a mixture of monoglycerides and diglycerides of naturally occurring saturated fatty acids having from sixteen to eighteen carbon atoms.

6. A process of making an article of manufacture according to claim 5 which comprises forming a melt containing riboflavin uniformly distributed in a molten material comprising essentially a mixture of monoglycerides and diglycerides of naturally occurring saturated fatty acids having from sixteen to eighteen carbon atoms; atomizing said melt into discrete liquid droplets having a diameter of from about 60 microns to about 250 microns; rapidly air-cooling said droplets into congealed state; and screening the resulting beadlets.

7. Pyridoxine hydrochloride in the form of pleasant-tasting beadlets having a diameter of from about 60 microns to about 250 microns; said beadlets being composed substantially entirely of said pyridoxine hydrochloride encased in a spray-chilled coating comprising essentially a mixture of monoglycerides and diglycerides of naturally occurring saturated fatty acids having from sixteen to eighteen carbon atoms.

8. A process of making an article of manufacture according to claim 7 which comprises forming a melt containing pyridoxine hydrochloride uniformly distributed in a molten material comprising essentially a mixture of monoglycerides and diglycerides of naturally occurring saturated fatty acids having from sixteen to eighteen carbon atoms; atomizing said melt into discrete liquid droplets having a diameter of from about 60 microns to about 250 microns; rapidly air-cooling said droplets into congealed state; and screening the resulting beadlets.

References Cited in the file of this patent

UNITED STATES PATENTS

| | | |
|---|---|---|
| 2,709,149 | Dunmire | May 24, 1955 |
| 2,777,797 | Hochberg et al. | Jan. 15, 1957 |
| 2,796,380 | Maietta | June 18, 1957 |
| 2,805,977 | Robinson | Sept. 10, 1957 |
| 2,816,854 | Gross | Dec. 17, 1957 |
| 2,832,720 | Bacher et al. | Apr. 29, 1958 |
| 2,956,926 | Grief | Oct. 18, 1960 |
| 3,037,911 | Stoyle et al. | June 5, 1962 |

FOREIGN PATENTS

| | | |
|---|---|---|
| 1,078,283 | Germany | Mar. 24, 1960 |